US011108259B2

(12) United States Patent
Ito

(10) Patent No.: US 11,108,259 B2
(45) Date of Patent: Aug. 31, 2021

(54) CHARGING CONTROL APPARATUS FOR VEHICLE

(71) Applicant: TOYOTA JIDOSHA KABUSHIKI KAISHA, Toyota (JP)

(72) Inventor: Fumito Ito, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 49 days.

(21) Appl. No.: 16/677,924

(22) Filed: Nov. 8, 2019

(65) Prior Publication Data

US 2020/0161874 A1 May 21, 2020

(30) Foreign Application Priority Data

Nov. 16, 2018 (JP) .............................. JP2018-216030

(51) Int. Cl.
| | |
|---|---|
| *B60W 10/26* | (2006.01) |
| *H02J 7/00* | (2006.01) |
| *B60L 15/40* | (2006.01) |
| *B60L 7/16* | (2006.01) |
| *H02J 7/04* | (2006.01) |

(52) U.S. Cl.
CPC ............... *H02J 7/007* (2013.01); *B60L 7/16* (2013.01); *B60L 15/40* (2013.01); *H02J 7/045* (2013.01)

(58) Field of Classification Search
CPC ...... H02J 7/007; H02J 7/045; B60L 7/16; B60L 15/40; B60W 10/26
See application file for complete search history.

(56) References Cited

U.S. PATENT DOCUMENTS

| 6,381,522 B1 | 4/2002 | Watanabe et al. |
| 6,507,127 B1 | 1/2003 | Amano et al. |
| 2009/0114463 A1* | 5/2009 | DeVault ............... B60W 10/26 |
| | | 180/65.29 |

FOREIGN PATENT DOCUMENTS

| JP | 2000-232703 A | 8/2000 |
| JP | 2001-095105 A | 4/2001 |

* cited by examiner

*Primary Examiner* — Cortez M Cook
(74) *Attorney, Agent, or Firm* — Sughrue Mion, PLLC

(57) ABSTRACT

A charging control apparatus: an information acquisition circuit configured to acquire, when a storage battery of a vehicle that is being stopped is charged with the power from the external power supply, location information indicating a current location of the vehicle, and altitude information on surroundings of the current location; a calculation circuit configured to calculate, when a travel route has not been designated, a change amount of a state of charge (SOC) of the storage battery from the current location to at least one predetermined point in the surroundings, based on the location information and the altitude information; and a setting circuit configured to set, based on the calculated change amount of the SOC, a charge amount of the storage battery to be charged with the power from the external power supply.

16 Claims, 4 Drawing Sheets

FIG.2

|  | 10000 | 8000 | 6000 | 4000 | 2000 | 0 | 2000 | 4000 | 6000 | 8000 | 10000 |
|---|---|---|---|---|---|---|---|---|---|---|---|
| 10000 | 0 | 400 | 800 | 1200 | 1600 | 2000 | 2400 | 2800 | 3200 | 3600 | 4000 |
| 8000 | 0 | 400 | 800 | 1200 | 1600 | 2000 | 2400 | 2800 | 3200 | 3600 | 4000 |
| 6000 | 0 | 400 | 800 | 1200 | 1600 | 2000 | 2400 | 2800 | 3200 | 3600 | 4000 |
| 4000 | 0 | 400 | 800 | 1200 | 1600 | 2000 | 2400 | 2800 | 3200 | 3600 | 4000 |
| 2000 | 0 | 400 | 800 | 1200 | 1600 | 2000 | 2400 | 2800 | 3200 | 3600 | 4000 |
| 0 | 0 | 400 | 800 | 1200 | 1600 | 2000 | 2000 | 2000 | 2000 | 2000 | 2000 |
| 2000 | 0 | 400 | 800 | 1200 | 1600 | 1600 | 1600 | 1600 | 1600 | 1600 | 1600 |
| 4000 | 0 | 400 | 800 | 1200 | 1200 | 1200 | 1200 | 1200 | 1200 | 1200 | 1200 |
| 6000 | 0 | 400 | 800 | 800 | 800 | 800 | 800 | 800 | 800 | 800 | 800 |
| 8000 | 0 | 400 | 400 | 400 | 400 | 400 | 400 | 400 | 400 | 400 | 400 |
| 10000 | 0 | 0 | 0 | 0 | 0 | 0 | 0 | 0 | 0 | 0 | 0 |

FIG.3

|  | 10000 | 8000 | 6000 | 4000 | 2000 | 0 | 2000 | 4000 | 6000 | 8000 | 10000 |
|---|---|---|---|---|---|---|---|---|---|---|---|
| 10000 | -71.72 | -54.39 | -36.68 | -18.46 | 0.396 | 20 | 40.4 | 61.54 | 83.32 | 105.6 | 128.3 |
| 8000 | -74.39 | -57.37 | -40 | -22.11 | -3.508 | 16 | 36.49 | 57.89 | 80 | 102.6 | 125.6 |
| 6000 | -76.68 | -60 | -43.03 | -25.58 | -7.351 | 12 | 32.65 | 54.42 | 76.97 | 100 | 123.3 |
| 4000 | -78.46 | -62.11 | -45.58 | -28.69 | -11.06 | 8 | 28.94 | 51.31 | 74.42 | 97.89 | 121.5 |
| 2000 | -79.6 | -63.51 | -47.35 | -31.06 | -14.34 | 4 | 25.66 | 48.94 | 72.65 | 96.49 | 120.4 |
| 0 | -80 | -64 | -48 | -32 | -16 | 0 | 4 | 8 | 12 | 16 | 20 |
| 2000 | -79.6 | -63.51 | -47.35 | -31.06 | -14.34 | -16 | -14.34 | -11.06 | -7.351 | -3.508 | 0.396 |
| 4000 | -78.46 | -62.11 | -45.58 | -28.69 | -31.06 | -32 | -31.06 | -28.69 | -25.58 | -22.11 | -18.46 |
| 6000 | -76.68 | -60 | -43.03 | -45.58 | -47.35 | -48 | -47.35 | -45.58 | -43.03 | -40 | -36.68 |
| 8000 | -74.39 | -57.37 | -60 | -62.11 | -63.51 | -64 | -63.51 | -62.11 | -60 | -57.37 | -54.39 |
| 10000 | -71.72 | -74.39 | -76.68 | -78.46 | -79.6 | -80 | -79.6 | -78.46 | -76.68 | -74.39 | -71.72 |

CHARGING CONTROL APPARATUS FOR VEHICLE

CROSS-REFERENCE TO RELATED APPLICATION(S)

The present application claims priority to and incorporates by reference the entire contents of Japanese Patent Application No. 2018-216030 filed in Japan on Nov. 16, 2018.

BACKGROUND

1. Technical Field

The present disclosure relates to a charging control apparatus for a vehicle.

2. Related Art

JP 2001-095105 A discloses a method for controlling the charge rate of a battery using an altitude by estimating, based on the vehicle speed and the driving torque, the slope of the road on which a vehicle is traveling to calculate the altitude, although a travel route has not been designated. With the configuration disclosed in JP 2001-095105 A, the average value of the altitudes in the travelling section until the current location is calculated to determine whether the road on which the vehicle is traveling is uphill or downhill by comparing the average value with the current altitude. In addition, with the configuration disclosed in JP 2001-095105 A, charging is controlled so as to change the target value, the upper limit value, or the lower limit value of the charge rate of the battery depending on the difference between the average value and the current altitude.

SUMMARY

With the configuration disclosed in JP 2001-095105 A, charging can be controlled during traveling, and if, for example, the battery is fully charged before traveling and if the charging is controlled so that the charge rate of the battery is decreased before a downhill after the charging, the power charged from an external power supply before the traveling is released as thermal energy or the like, and the electricity cost is deteriorated. For this reason, although a travel route has not been designated, it is desirable to control a charge amount so that charged power of the battery is suitable for future traveling when the battery is charged with the power from the external power supply.

In some embodiments, provided is a charging control apparatus for a vehicle including a storage battery configured to be charged with power supplied from an external power supply and with power regenerated by a motor connected to a wheel. The charging control apparatus includes: an information acquisition circuit configured to acquire, when the storage battery of the vehicle that is being stopped is charged with the power from the external power supply, location information indicating a current location of the vehicle, and altitude information on surroundings of the current location; a calculation circuit configured to calculate, when a travel route has not been designated, a change amount of a state of charge (SOC) of the storage battery from the current location to at least one predetermined point in the surroundings, based on the location information and the altitude information; and a setting circuit configured to set, based on the calculated change amount of the SOC, a charge amount of the storage battery to be charged with the power from the external power supply in consideration of transition of the SOC that changes when the vehicle travels in a plurality of routes toward different predetermined points.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 2 is a control map illustrating altitude information in which a current location is centered;

FIG. 3 is a control map illustrating the change amount of the SOC from the current location;

DETAILED DESCRIPTION

Hereinafter, a charging control apparatus for a vehicle in an embodiment of the disclosure is described in detail with reference to the drawings. The disclosure is not limited to the embodiment described below.

Figure 1:
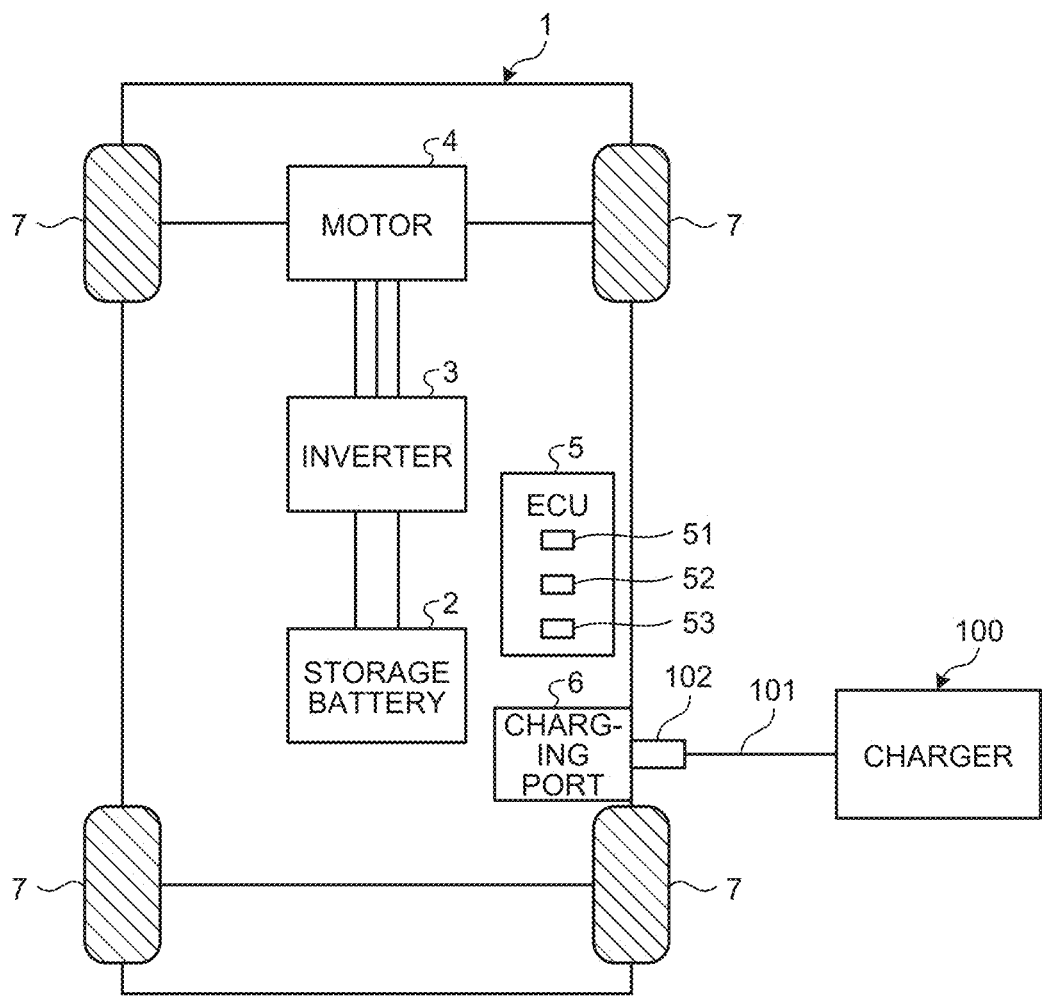
FIG. 1 is a diagram schematically illustrating a vehicle and an external power supply in an embodiment.

FIG. 1 is a diagram schematically illustrating a vehicle and an external power supply in an embodiment. A vehicle 1 includes a storage battery 2, an inverter 3, a motor 4, an ECU 5, a charging port 6, and wheels 7. The vehicle 1 is an electric vehicle using the motor 4 as a power source for traveling, and is equipped with the storage battery 2 storing power to be supplied to the motor 4. The power of the storage battery 2 is supplied to the motor 4 via the inverter 3, and thereby driving the motor 4. The vehicle 1 illustrated in FIG. 1 is a front-wheel drive vehicle, and the power output from the motor 4 is transmitted only to the front wheels among the four wheels 7. The vehicle 1 is configured to charge the storage battery 2 with the power supplied from a charger 100, which is an external power supply, via the charging port 6.

The storage battery 2 is a battery having a plurality of battery cells, and is implemented by a secondary battery capable of storing power to be supplied to the motor 4. In order to drive the motor 4, the power output from the storage battery 2 is supplied to the motor 4 via the inverter 3. The storage battery 2 is further capable of storing the power supplied from the external power supply via the charging port 6 and of storing the power regenerated by the motor 4 due to regenerative braking.

The inverter 3 is a power conversion apparatus that converts DC power supplied from the storage battery 2 into AC power to supply the AC power to the motor 4. The inverter 3 is provided with a plurality of switching elements corresponding to phases of the motor 4. The switching elements constituting the inverter 3 are switched between on and off by performing switching control of the ECU 5.

The motor 4 consumes the power stored in the storage battery 2 to drive while the vehicle 1 is traveling. The motor 4 is implemented by a three-phase AC motor. The vehicle 1 may include a transmission or a differential device (neither of which is illustrated) between the motor 4 and the wheels 7. The motor 4 is capable of performing a motor function and a power generation function. When the vehicle 1 travels on a downhill road, the motor 4 functions as a regenerative brake, and thereby charging the storage battery 2 with the power regenerated by the motor 4.

The ECU 5 is implemented by an electronic control apparatus including a CPU, a storage storing data, such as various programs, a calculation processing unit that performs various calculations for driving and controlling the motor 4, and a control unit that variously performs control. For example, the ECU 5 outputs, to the inverter 3, a command signal for controlling the inverter 3 as a result of the calculation of the calculation processing unit. The ECU 5 further performs external charging control for charging the storage battery 2 with the power supplied from the charger 100 that is the external power supply.

The charging port 6 is a connection port to be connected to the charger 100, which is a charging facility, when the storage battery 2 is charged with power from the external power supply. The charger 100 is implemented by a charging stand including a charging cable 101 and a charging plug 102. The charging plug 102 of the charger 100 is connected to the charging port 6. For example, when the charger 100, which is the external power supply, is a DC charging stand (quick charging stand) that outputs DC power, the charging plug 102 is a DC plug, and the charging port 6 is a DC inlet. Alternatively, when the charger 100, which is the external power supply, is an AC charging stand (normal charging stand) that outputs AC power, the charging plug 102 is an AC plug, and the charging port 6 is an AC inlet.

The charging port 6 further includes a positive electrode terminal and a negative electrode terminal (not illustrated), and a relay unit (not illustrated) between the charging port 6 and the storage battery 2. The relay unit includes a positive-electrode-terminal-side switching element provided on the positive electrode terminal side of the charging port 6 and a negative-electrode-terminal-side switching element provided on the negative electrode terminal side of the charging port 6. The ECU 5 controls the relay unit so that the charging port 6 and the storage battery 2 are electrically connected to each other when the storage battery 2 is charged with the power from the charger 100. Specifically, while the storage battery 2 is being charged with the power from the charger 100, the relay unit conductively connects the charging port 6 and the storage battery 2. On the other hand, while the storage battery 2 is not being charged with the power from the charger 100, the relay unit cuts the electrical connection between the charging port 6 and the storage battery 2.

In addition, when the storage battery 2 is charged with the power from the charger 100, which is a charging facility, the ECU 5 performs charge amount control for controlling a state of charge (SOC) of the storage battery 2 to a charge amount suitable for future travelling. When a travel route has not been designated, the charge amount control is for setting a charge amount when the storage battery 2 is charged with the power from the charger 100 based on altitude information. That is, the ECU 5 performs the charge amount control when the vehicle 1 is being stopped and the designation after the charging has not been set. The SOC is a numerical value indicating a charging state of the storage battery 2, and is expressed by [%].

The ECU 5 calculates, based on current location information and altitude information on surroundings, a change amount of the SOC from the current location to each surrounding point. The ECU 5 calculates a decrease amount (power consumption amount) of the SOC with respect to a travel distance from the current location to each surrounding point, and calculates a decrease amount (power consumption amount) and an increase amount (power regeneration amount) of the SOC with respect to an altitude difference between the current location and each surrounding point. In order to reduce the brake loss when the vehicle 1 travels downhill, the ECU 5 calculates, based on the information on the change amount of the SOC calculated in this manner, a charge amount of the power to be charged in the storage battery 2 via the charging port 6 to secure a charge amount sufficient for a cruising range of the vehicle 1.

The current location information is location information indicating the current location of the vehicle 1. For example, the ECU 5 acquires the current location information from a navigation system. The ECU 5 further acquires location information on the vehicle 1 by a global positioning system (GPS). The ECU 5 is capable of acquiring location information on a charging place at which the charger 100 is installed, by communicating with the charger 100 that is the external power supply. At the time of charging the vehicle 1 with the power from the charger 100, the charging place indicates the current location of the vehicle 1, and thus it is possible to use the charging place as the current location.

The altitude information indicates the altitudes around the current location. For example, the ECU 5 acquires map information from a navigation system, and acquires the altitude information based on the map information. The ECU 5 is capable of acquiring altitude information on a charging place at which the charger 100 is installed, by communicating with the charger 100 that is the external power supply. At the time of charging the vehicle 1 with the power from the charger 100, it is possible to set the altitude information on the charging place as the altitude information on the current location.

The ECU 5 includes an information acquisition circuit 51 that acquires current location information and altitude information, a calculation circuit 52 that calculates a change amount of the SOC that changes while the vehicle 1 reaches each surrounding point from the current location, and a setting circuit 53 that sets a charge amount based on the calculated change amount of the SOC. The information acquisition circuit 51 of the ECU 5 acquires the current location information and the altitude information from the charger 100 that is a charging stand, by communicating with the charger 100 while the charging plug 102 is connected to the charging port 6, for example. The calculation circuit 52 of the ECU 5 calculates, based on the altitude information on the surroundings acquired by the information acquisition circuit 51, a decrease amount and an increase amount of the SOC due to future traveling. The ECU 5 uses a control map to perform the calculation within a range in which the travel distance from the current location is a predetermined distance. Then, the setting circuit 53 of the ECU 5 sets, based on the calculated change amount of the SOC, the charge amount considering a transition of the SOC that changes when the vehicle 1 travels in a plurality of courses toward different points in the control map.

FIG. 2 is a control map illustrating altitude information in which the current location is centered. In the map illustrated in FIG. 2, the current location is indicated at a central point where the vertical and horizontal axes are zero. The vertical axis and the horizontal axis represent distances. Each square obtained by dividing the control map into squares in accordance with the distance from the current location represents a destination candidate point. The number in each square indicates the altitude. The larger the number in the square becomes, the higher the altitude is.

In the example illustrated in FIG. 2, the altitude of the current location is "2000", and the numbers in the squares become larger toward the upper right point in the map, which means that the altitude becomes higher. The altitude difference between the altitude of each point on the upper right of the map and the altitude of the current location (the altitude of a candidate location point−the altitude of the current location) is a positive value. When the altitude difference is a positive value, traveling toward the candidate point consumes power, and thus the SOC decreases. On the other hand, the altitude difference between each point on the lower left of the map and the altitude of the current location is a negative value. When the altitude difference is a negative value, regenerative control can be performed in traveling toward the point, and thus the SOC increases.

Then, the ECU 5 calculates the change amount of the SOC obtained by summing up the amount of power consumed when the vehicle 1 electrically travels on a flat road (the decrease amount of the SOC) and the change amount of the SOC calculated based on the altitude information. That is, the calculation circuit 52 of the ECU 5 calculates the decrease amount of the SOC due to the consumption of the power of the storage battery 2 when the vehicle 1 electrically travels on a flat road from the current location to each of a plurality of points. The decrease amount of the SOC with respect to the travel distance of the vehicle 1 means that a power consumption amount increases as a distance from the current location to each point increases. The calculation circuit 52 of the ECU 5 further calculates, based on altitude differences between the current location and the plurality of points, the decrease amount of the SOC due to the consumption of the power of the storage battery 2 when the vehicle 1 travels on an uphill road, and the increase amount of the SOC due to the power regenerated by the motor 4 when the vehicle 1 travels on a downhill road. The calculation circuit 52 of the ECU 5 further calculates, based on the decrease amount and the increase amount, the change amount of the SOC from the current location to each of the plurality of points by adding the change amount of the SOC with respect to the distance and the change amount of the SOC with respect to the altitude. The table illustrating the change amount of the SOC obtained by adding these is exemplified in FIG. 3.

FIG. 3 is a control map illustrating the change amount of SOC from the current location. The number in each square illustrated in FIG. 3 indicates the change amount of the SOC. When the number in a square is a positive value, this indicates power consumption, and when the number is a negative value, this indicates power regeneration. In the map illustrated in FIG. 3, the current location is indicated at a central point where the vertical and horizontal axes are zero. The vertical axis and the horizontal axis represent distances. In addition, each point of FIG. 3 is the same as each point of FIG. 2.

As illustrated in FIG. 3, the change amount of the SOC at each point on the upper right of the map is a positive value. Since the SOC is indicated by [%], when the SOC of the storage battery 2 is reduced due to power consumption in comparison with the current SOC, the SOC is reduced by a positive value illustrated in FIG. 3. For example, traveling of the vehicle 1 toward a higher-altitude point consumes power. In addition, at a point where a positive value exceeds 100, power exceeding the power of the fully charged storage battery 2 is consumed. That is, this means that the vehicle 1 cannot reach the point only by electrically traveling after charging, even if all the power of the storage battery 2 is consumed until the point where the number in the square exceeds 100 on the map illustrated in FIG. 3. Thus, since the value at the upper right point of FIG. 3 is "128.3" exceeding 100%, the amount of power is insufficient even if the storage battery 2 is fully charged at the current location.

On the other hand, the change amount of the SOC at a point except for the upper right of the map illustrated in FIG. 3 is a negative value. Since the SOC is indicated [%], when the SOC of the storage battery 2 is increased due to regeneration power in comparison with the current SOC, the SOC is increased by a negative value illustrated in FIG. 3. At a point where the altitude is lower than the current location, the storage battery 2 can be charged with power regenerated by performing regenerative braking while the vehicle 1 travels downhill. It is possible for the vehicle 1 to reach a point where the change amount is a negative value without consuming the power of the storage battery 2 stored at the current location. In other words, in order to perform regenerative braking to reach a point where the change amount is a negative value, the charge amount of the storage battery 2 needs a room, and it is not desirable that the storage battery 2 is fully charged at the current location. If the storage battery 2 is fully charged, regenerative braking cannot be performed when the vehicle 1 travels downhill, or the power charged from the external power supply before traveling should be discarded as thermal energy during traveling to perform regenerative braking.

Thus, the ECU 5 performs charge amount control for controlling the charge amount suitable for the future traveling to the power supplied from the external power supply in the state of the current location.

Figure 4:
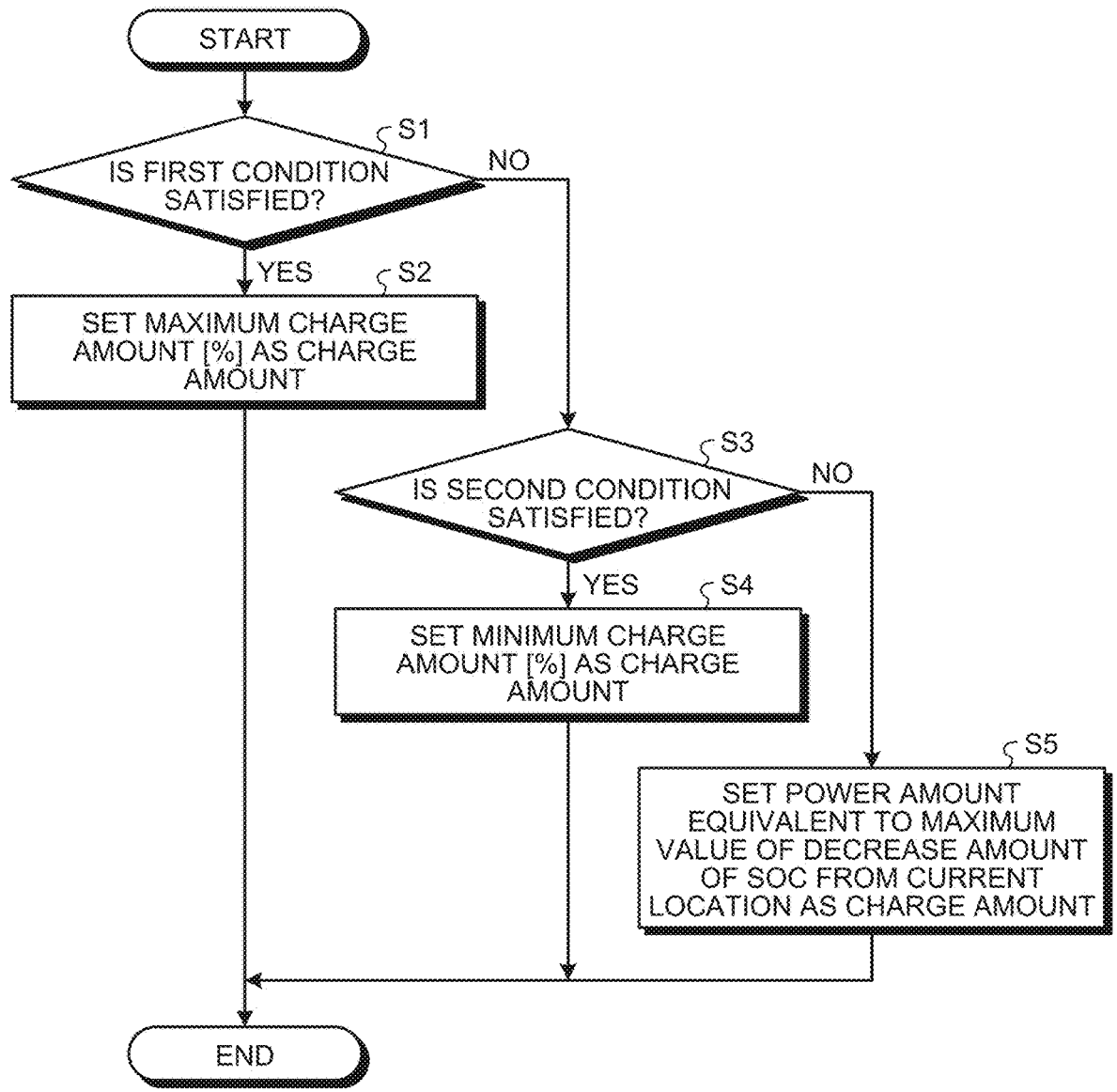
FIG. 4 is a flowchart illustrating a control procedure of charge amount control.

FIG. 4 is a flowchart illustrating a control procedure of charge amount control. The control procedure illustrated in FIG. 4 is performed by the ECU 5. The control routine illustrated in FIG. 4 is performed when the vehicle 1 is charged with power from the external power supply.

The ECU 5 determines, as a first condition, whether the maximum value of the change amount of the SOC from the current location is 100% or more (Step S1). In Step S1, it is determined whether the first condition is satisfied. "The maximum value of the change amount of the SOC from the current location is 100% or more" means that when a candidate location is compared with the current location in the control map, even if the storage battery 2 is fully charged at the current location, all the power of the fully charged storage battery 2 is consumed until the vehicle 1 reaches the candidate location.

When the first condition is satisfied (Step S1: Yes), the ECU 5 sets the maximum value of the change amount of the SOC (maximum charge amount) as the charge amount (Step S2). In Step S2, the charge amount is set to the amount for fully charging the storage battery 2. Since the change amount of the SOC is 100% or more when the first condition is satisfied, the charge amount is controlled so that the storage battery 2 is fully charged with the power from the external power supply to secure the predicted power consumption amount (the decrease amount of the SOC). When Step S2 is performed, the control routine is terminated.

When the first condition is not satisfied (Step S1: No), the ECU 5 determines, as a second condition, whether the maximum value of the change amount of the SOC from the current location is 0% or less (Step S3). In Step S2, it is determined whether the second condition is satisfied. "The maximum value of the change amount of the SOC from the current location is 0% or less" means that when a candidate location is compared with the current location in the control map, the vehicle 1 can reach all candidate locations in a regenerative state. For example, when the current location is the top of a mountain, regenerative control can be performed on a downhill road from the top of the mountain to any candidate location, and the amount of regeneration by the regenerative power can be secured.

When the second condition is satisfied (Step S3: Yes), the ECU 5 sets the minimum charge amount as the charge amount (Step S4). The minimum charge amount is a minimum value of the charge amount of power from the external power supply to be set at the time of charging power from the external power supply when the travel route has not been set. For example, the minimum charge amount includes the case of no charging, that is, the case of a charge amount of zero. When Step S4 is performed, the control routine is terminated.

When the second condition is not satisfied (Step S3: No), the ECU 5 sets the maximum value of the change amount of the SOC from the current location as the charge amount (Step S5). The maximum value of the change amount of the SOC used in Step S5 satisfies "0%<maximum value<100%". "The maximum value of the change amount of the SOC from the current location is greater than 0% and less than 100% (0%<maximum value<100%)" means that when a candidate location is compared with the current location in the control map, the vehicle 1 can electrically travel to reach any candidate location before the fully-charged power is consumed as long as the storage battery 2 is fully charged at the current location. In addition, that the change amount of the SOC is a positive value means that the power of the storage battery 2 is consumed and the SOC decreases. Thus, the maximum value of the change amount of the SOC in Step S5 represents the maximum value of the decrease amount of the SOC. In Step S5, the power amount equivalent to the maximum value of the power consumption amount (the decrease amount of the SOC) is set as the charge amount in order to secure the power for the vehicle 1 to travel toward the candidate location that is the most power consuming traveling in the control map. When Step S5 is performed, the control routine is terminated.

Figure 5:
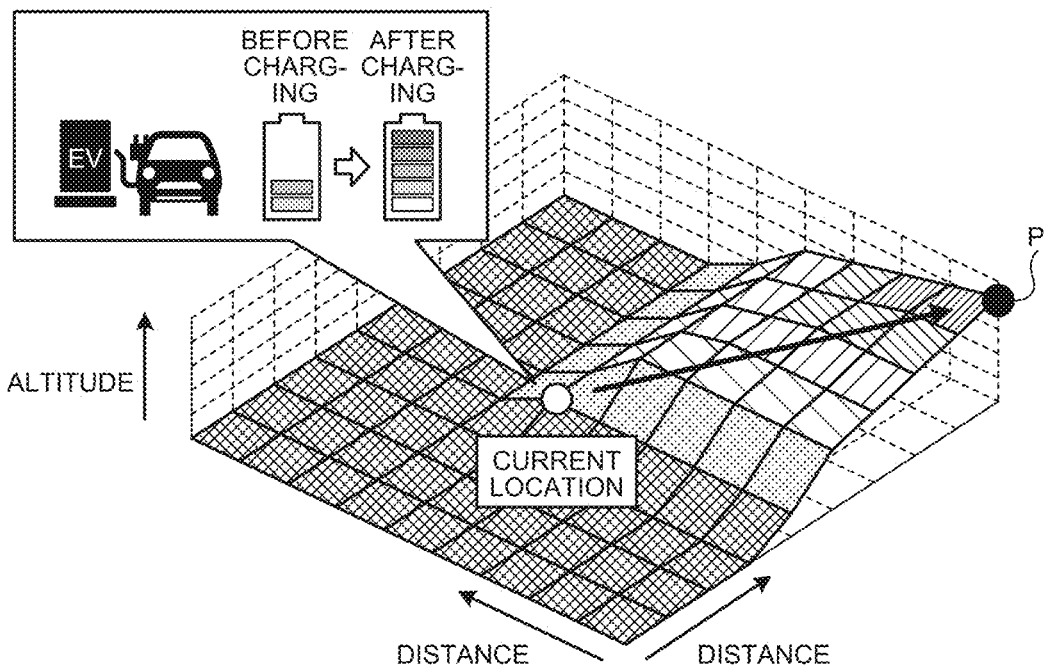
FIG. 5 is a diagram illustrating an example of a pattern from which it is determined that a storage battery should be fully charged.
Figure 6:
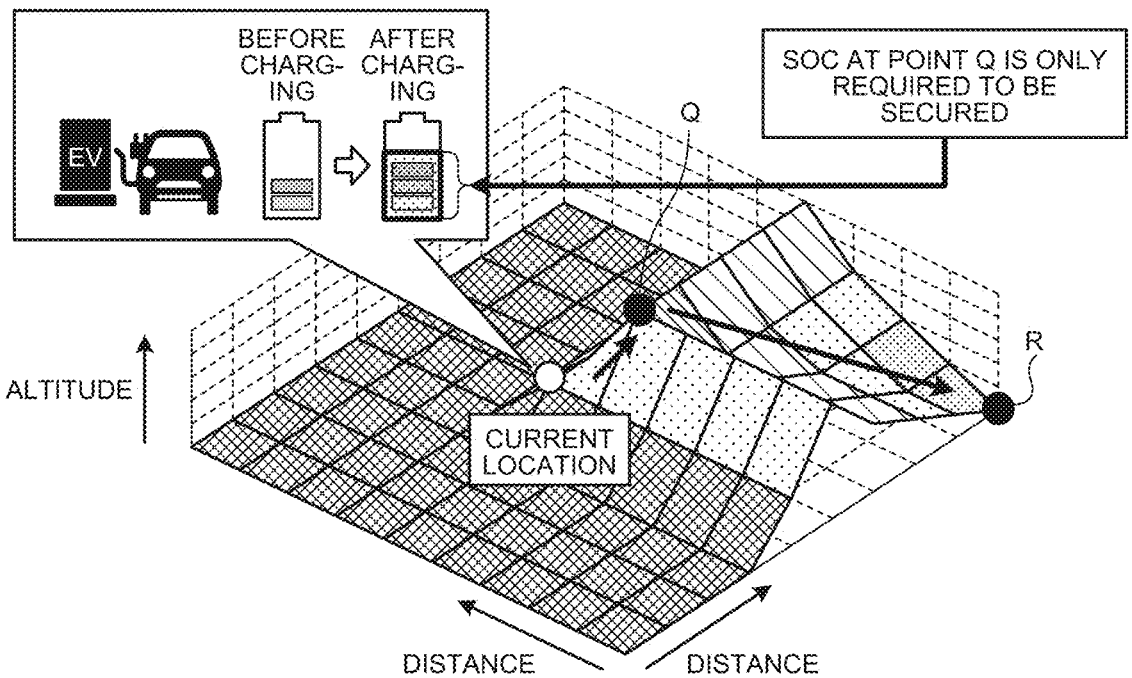
FIG. 6 is a diagram illustrating an example of a pattern from which it is determined that the storage battery does not have to be fully charged.

Here, with reference to FIGS. 5 and 6, the cases in which it is determined that the storage battery 2 should be fully charged at the time of charging the storage battery 2 with the power from the external power supply and it is determined that the storage battery 2 does not have to be fully charged at the time of charging the storage battery 2 with the power from the external power supply are described.

FIG. 5 is a diagram illustrating an example of a pattern from which the storage battery 2 is determined to be fully charged. As illustrated in FIG. 5, it is possible that the vehicle 1 travels to a destination (e.g., a point P) at a high altitude from the current location. In this case, in the traveling pattern from the current location to the point P, an upward slope continues. Thus, it is necessary to secure a charge amount sufficient for the vehicle 1 to reach the point P. Accordingly, the SOC of the storage battery 2 is set to the maximum charge amount at the time of charging the storage battery 2 with the power from the external power supply at the current location.

FIG. 6 is a diagram illustrating an example of a pattern from which it is determined that the storage battery 2 does not have to be fully charged. As illustrated in FIG. 6, there is a point Q at a high altitude as a destination from the current location, but it is possible that the future traveling route after the point Q is downhill. In the traveling pattern in this case, a descending slope continues from the point Q to a point R. Thus, it is only required to secure the charge amount sufficient for the vehicle 1 to consume the power for reaching the point Q at the highest altitude point from the current location. That is, the charge amount from the point Q to the point R after that highest altitude point is unnecessary. Thus, the charge amount is controlled to the amount sufficient for the amount of power to be consumed until the point Q at the time of charging the storage battery 2 with the power from the external power supply at the current location. That is, the setting circuit 53 of the ECU 5 sets, based on the change amount of the SOC calculated by the calculation circuit 52, the charge amount to the amount with which the SOC is not depleted until the vehicle 1 reaches the point Q. As a result, it is possible to prevent the storage battery 2 from being charged more than necessary in consideration of an increase in the SOC until the point R after the point Q.

According to the embodiment as described above, even if a travel route has not been designated, it is possible to control the charge amount based on the altitude information at the time of charging the storage battery 2 with the power from the external power supply. Thus, it is possible to secure a charge amount sufficient for the cruising range of the vehicle 1, and to reduce the braking loss when the vehicle 1 travels downhill.

In addition, the vehicle 1 has been described as an electric vehicle in the above embodiment, but the disclosure is not limited thereto. The disclosure is applicable to hybrid vehicles in addition to electric vehicles. In addition, the present application is applicable to both series type and parallel type of hybrid vehicles. When the above charging control is applied to a hybrid vehicle, since the SOC of a storage battery that supplies power to a motor serving as a motive power source is controlled, it is possible for the hybrid vehicle to continue traveling with the motive power output from the engine when the SOC of the storage battery decreases.

In addition, when acquiring the current location information and the altitude information from the charger 100, which is a charging stand, the information acquisition circuit 51 of the ECU 5 may acquire the information by near field communication with the charger 100, even if the charging plug 102 is not connected to the charging port 6. Thus, while the vehicle 1 is traveling so as to approach the charger 100, that is, before the charging plug 102 is connected to the charging port 6, it is possible to calculate the change amount of the SOC.

In addition, the method by which the ECU 5 acquires the current location information and the altitude information is not limited to the above information acquisition from the navigation system, the GPS, and the charging station (charger 100). The ECU 5 may acquire the information from a device to which the current location information and the altitude information can be input.

Furthermore, in the control map used by the calculation circuit 52 of the ECU 5, it is possible to set distances from the current location which indicate the range of the control map to the range including a charging facility different from the charging facility at the current location. That is, the above control map may include a plurality of chargeable places. The map information acquired by the ECU 5 from the navigation system includes information indicating a chargeable point at which a charging stand is installed. In this case, it is possible to set a charge amount to the amount sufficient for the vehicle 1 to electrically travel from the charging facility at the current location to the next nearest charging facility. Alternatively, as the setting method of the control map, the range of the control map may be set based on the cruising range in which the vehicle 1 can travel on a flat road with the fully charged storage battery 2. In this case, it is also possible to set the control map to have a range where the possible cruising range of the vehicle 1 is the upper limit distance.

According to the disclosure, even if a travel route has not been designated, it is possible to control a charge amount from an external power supply to a charge amount suitable for future traveling by calculating the change amount of the SOC using current location information and altitude information on surroundings and by setting the charge amount in consideration of the transition of the SOC that changes when a vehicle travels in a plurality of routes toward different predetermined points.

According to the disclosure, it is possible to calculate a decrease amount of the SOC with respect to distance based on the amount of power consumed when a vehicle electrically travels on a flat road, and to sum, based on the change amount of the SOC with respect to distance, the change amounts of the SOC calculated based on the altitude difference between a current location and each point. Thus, it is possible to calculate the change amount of the SOC that changes due to future traveling even if a travel route has not been designated at the time of charging.

According to the disclosure, it is possible to charge, in advance, a power amount sufficient for a vehicle to electrically travel to reach a destination from a current location at the time of charging the storage battery with the power from an external power supply when the vehicle continues to electrically travel to a point until which power consumption is increased. Thus, it is possible to secure a cruising range of the vehicle for electric traveling.

According to the disclosure, it is possible to secure a room in a charge amount by setting the charge amount to the minimum charge amount when it is determined from altitude information that a current location is a peak or a hill. Thus, it is possible to perform regenerative braking on a future downhill road, and to reduce brake loss.

According to the disclosure, it is possible to secure a cruising range for electric traveling with a charge amount smaller than the SOC in the fully charged state at the time of charging the storage battery with the power from an external power supply, and it is possible to set a charge amount suitable for future traveling.

According to the disclosure, it is possible to set a charge amount from an external power supply installed at a current location in consideration of charging at a different charging facility from the charging facility at the current location.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A charging control apparatus for a vehicle including a storage battery configured to be charged with power supplied from an external power supply and with power regenerated by a motor connected to a wheel, the charging control apparatus comprising:
    an information acquisition circuit configured to acquire, when the storage battery of the vehicle that is being stopped is charged with the power from the external power supply, location information indicating a current location of the vehicle, and altitude information on surroundings of the current location;
    a calculation circuit configured to calculate, when a travel route has not been designated, a change amount of a state of charge (SOC) of the storage battery from the current location to at least one predetermined point in the surroundings, based on the location information and the altitude information; and
    a setting circuit configured to set, based on the calculated change amount of the SOC, a charge amount of the storage battery to be charged with the power from the external power supply in consideration of transition of the SOC that changes when the vehicle travels in a plurality of routes toward different predetermined points, wherein
    the at least one predetermined point includes a plurality of points having different distances from the current location, and
    the calculation circuit is configured to
        calculate a first decrease amount of the SOC due to consumption of power of the storage battery when the vehicle electrically travels on a flat road from the current location to each of the plurality of points,
        calculate, based on altitude differences between the current location and the plurality of points, a second decrease amount of the SOC due to consumption of power of the storage battery when the vehicle electrically travels on an uphill road, and an increase amount of the SOC due to power regenerated by the motor when the vehicle travels on a downhill road, and
        calculate, based on the first decrease amount, the second decrease amount, and the increase amount, change amounts of the SOC from the current location to the plurality of points.

2. The charging control apparatus for the vehicle according to claim 1, wherein
    the setting circuit is configured to set the charge amount to a maximum charge amount when a maximum value of a power consumption amount at a point of the plurality of points until which power is consumed from a current SOC exceeds a power amount of a fully charged storage battery.

3. The charging control apparatus for the vehicle according to claim 1, wherein
    the setting circuit is configured to set the charge amount to a minimum charge amount when a power amount is increased from a current SOC at all the plurality of points due to power regenerated by the motor.

4. The charging control apparatus for the vehicle according to claim 2, wherein
    the setting circuit is configured to set the charge amount to a minimum charge amount when a power amount is increased from a current SOC at all the plurality of points due to power regenerated by the motor.

5. The charging control apparatus for the vehicle according to claim 1, wherein
    the setting circuit is configured to set, when a maximum value of a power consumption amount among the calculated change amounts of the SOC from the current location to the plurality of points does not exceed a power amount of a fully charged storage battery, the charge amount to a power amount equivalent to the maximum value.

6. The charging control apparatus for the vehicle according to claim 2, wherein the setting circuit is configured to set, when a maximum value of a power consumption amount among the calculated change amounts of the SOC from the current location to the plurality of points does not exceed a power amount of a fully charged storage battery, the charge amount to a power amount equivalent to the maximum value.

7. The charging control apparatus for the vehicle according to claim 3, wherein
the setting circuit is configured to set, when a maximum value of a power consumption amount among the calculated change amounts of the SOC from the current location to the plurality of points does not exceed a power amount of a fully charged storage battery, the charge amount to a power amount equivalent to the maximum value.

8. The charging control apparatus for the vehicle according to claim 4, wherein
the setting circuit is configured to set, when a maximum value of a power consumption amount among the calculated change amounts of the SOC from the current location to the plurality of points does not exceed a power amount of a fully charged storage battery, the charge amount to a power amount equivalent to the maximum value.

9. The charging control apparatus for the vehicle according to claim 1, wherein
the information acquisition circuit is configured to acquire map information from a navigation system,
the map information includes the altitude information, and information on a chargeable point indicating a charging place at which the external power supply is installed, and
the at least one predetermined point is set to include a plurality of chargeable points.

10. The charging control apparatus for the vehicle according to claim 2, wherein
the information acquisition circuit is configured to acquire map information from a navigation system,
the map information includes the altitude information, and information on a chargeable point indicating a charging place at which the external power supply is installed, and
the at least one predetermined point is set to include a plurality of chargeable points.

11. The charging control apparatus for the vehicle according to claim 3, wherein
the information acquisition circuit is configured to acquire map information from a navigation system,
the map information includes the altitude information, and information on a chargeable point indicating a charging place at which the external power supply is installed, and
the at least one predetermined point is set to include a plurality of chargeable points.

12. The charging control apparatus for the vehicle according to claim 4, wherein
the information acquisition circuit is configured to acquire map information from a navigation system,
the map information includes the altitude information, and information on a chargeable point indicating a charging place at which the external power supply is installed, and
the at least one predetermined point is set to include a plurality of chargeable points.

13. The charging control apparatus for the vehicle according to claim 5, wherein
the information acquisition circuit is configured to acquire map information from a navigation system,
the map information includes the altitude information, and information on a chargeable point indicating a charging place at which the external power supply is installed, and
the at least one predetermined point is set to include a plurality of chargeable points.

14. The charging control apparatus for the vehicle according to claim 6, wherein
the information acquisition circuit is configured to acquire map information from a navigation system,
the map information includes the altitude information, and information on a chargeable point indicating a charging place at which the external power supply is installed, and
the at least one predetermined point is set to include a plurality of chargeable points.

15. The charging control apparatus for the vehicle according to claim 7, wherein
the information acquisition circuit is configured to acquire map information from a navigation system,
the map information includes the altitude information, and information on a chargeable point indicating a charging place at which the external power supply is installed, and
the at least one predetermined point is set to include a plurality of chargeable points.

16. The charging control apparatus for the vehicle according to claim 8, wherein
the information acquisition circuit is configured to acquire map information from a navigation system,
the map information includes the altitude information, and information on a chargeable point indicating a charging place at which the external power supply is installed, and
the at least one predetermined point is set to include a plurality of chargeable points.

* * * * *